(12) United States Patent
Heitz et al.

(10) Patent No.: US 12,474,195 B2
(45) Date of Patent: Nov. 18, 2025

(54) FILLING LEVEL MEASURING DEVICE AND METHOD FOR THE IN-LINE CALIBRATION AND/OR VERIFICATION OF A FILLING LEVEL MEASURING DEVICE

(71) Applicant: Endress+Hauser SE+Co. KG, Maulburg (DE)

(72) Inventors: Ulrich Heitz, Lorsch (DE); Norbert Thomann, Weil am Rhein (DE); Jürgen Steitz, Wiesbaden (DE); Ralf Reimelt, Freiburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 315 days.

(21) Appl. No.: 18/256,963

(22) PCT Filed: Nov. 26, 2021

(86) PCT No.: PCT/EP2021/083165
§ 371 (c)(1),
(2) Date: Jun. 12, 2023

(87) PCT Pub. No.: WO2022/122416
PCT Pub. Date: Jun. 16, 2022

(65) Prior Publication Data
US 2024/0044692 A1 Feb. 8, 2024

(30) Foreign Application Priority Data
Dec. 10, 2020 (DE) .................... 10 2020 132 964.4

(51) Int. Cl.
*G01F 25/20* (2022.01)
*G01F 23/284* (2006.01)
*G01R 1/067* (2006.01)

(52) U.S. Cl.
CPC ............ *G01F 25/20* (2022.01); *G01F 23/284* (2013.01); *G01R 1/06772* (2013.01)

(58) Field of Classification Search
CPC ... G01F 25/20; G01F 23/284; G01R 1/06772; G01R 31/2822
See application file for complete search history.

(56) References Cited

U.S. PATENT DOCUMENTS

| | | | |
|---|---|---|---|
| 5,733,141 A * | 3/1998 | Penrod | H01R 13/72 439/4 |
| 7,924,216 B2 * | 4/2011 | Delin | G01F 23/284 73/290 R |

(Continued)

FOREIGN PATENT DOCUMENTS

| | | |
|---|---|---|
| CN | 102401681 A | 9/2011 |
| CN | 203163812 U | 8/2013 |

(Continued)

OTHER PUBLICATIONS

Blattenberger, K. (Aug. 25, 2021). Coaxial cable equations. RF CafÃ©. https://www.rfcafe.com/references/electrical/coax.htm (Year: 2021).*

(Continued)

*Primary Examiner* — Vladimir Magloire
*Assistant Examiner* — Anna K. Gosling
(74) *Attorney, Agent, or Firm* — Mark A. Logan; Endress+Hauser (USA) Holding, Inc.

(57) ABSTRACT

A filling level measuring device for the microwave-based determination of the filling level of a filling material in a container includes at least one reflection point arranged outside the container. The reflection point generates a reflection point echo signal by means of reflection of a transmit signal, wherein an electronics unit calibrates and/or verifies a filling material echo signal in-line based upon the at least one reflection point echo signal. Further disclosed is a (Continued)

method for the in-line calibration and/or verification of a filling level measuring device.

4 Claims, 3 Drawing Sheets

(56) References Cited

U.S. PATENT DOCUMENTS

| | | | |
|---|---|---|---|
| 9,325,077 B2 * | 4/2016 | Korsbo | G01F 23/284 |
| 10,935,634 B2 | 3/2021 | Vermeulen | |
| 2006/0015292 A1 * | 1/2006 | Lubcke | G01F 25/20 |
| | | | 702/183 |
| 2009/0158839 A1 | 6/2009 | Spanke et al. | |
| 2009/0273506 A1 | 11/2009 | Delin | |
| 2009/0303106 A1 | 12/2009 | Edvardsson | |
| 2011/0081256 A1 | 4/2011 | Thompson et al. | |
| 2011/0248725 A1 | 10/2011 | Mukherjee | |
| 2012/0169490 A1 | 7/2012 | Yu et al. | |
| 2014/0104099 A1 | 4/2014 | Janitch | |
| 2015/0276461 A1 | 10/2015 | Guzman et al. | |
| 2016/0003662 A1 * | 1/2016 | Dayal | G01R 27/26 |
| | | | 73/304 R |
| 2016/0103008 A1 | 4/2016 | Edvardsson et al. | |
| 2018/0156652 A1 | 6/2018 | Williams et al. | |

FOREIGN PATENT DOCUMENTS

| | | |
|---|---|---|
| CN | 105509840 A | 4/2016 |
| CN | 106017612 A | 10/2016 |
| CN | 111288966 A | 6/2020 |
| DE | 2440402 A1 | 3/1975 |
| DE | 10136754 A1 | 2/2003 |
| DE | 102006019191 A1 | 10/2007 |
| DE | 102012218574 A1 | 4/2014 |
| EP | 0066962 A1 | 12/1982 |

OTHER PUBLICATIONS

Teran, N. (Apr. 29, 2020). Dealing with impedance mismatching. Show Me Cables. https://www.showmecables.com/blog/post/cable-impedance-mismatching (Year: 2020).*

* cited by examiner

FILLING LEVEL MEASURING DEVICE AND METHOD FOR THE IN-LINE CALIBRATION AND/OR VERIFICATION OF A FILLING LEVEL MEASURING DEVICE

CROSS-REFERENCE TO RELATED APPLICATIONS

The present application is related to and claims the priority benefit of DPMA Patent Application No. 10 2020 132 964.4, filed on Dec. 10, 2020, and International Patent Application No. PCT/EP2021/083165, filed Nov. 26, 2021, the entire contents of which are incorporated herein by reference.

TECHNICAL FIELD

The invention relates to a filling level measuring device for the microwave-based determination of the filling level of a filling material in a container. Furthermore, the invention relates to a method for the in-line calibration and/or verification of a filling level measuring device.

BACKGROUND

Microwave-based filling level measuring devices are used in many applications, in particular where a high degree of accuracy is required in determining the filling level of the filling material. For example, in the food processing, pharmaceutical, and/or chemical industries, the quantities in reaction processes must be determined precisely. Similarly, in the oil and gas industry, a precise determination of a filling material in a container is required—for example, in the event that a payment amount in commercial transactions is determined on the basis of a precise quantity. Depending upon the application in the above-mentioned industries, the filling material can be liquid, for example, but can also consist of solid particles, i.e., be substantially granular.

Microwave-based filling level measuring devices typically comprise an electronics unit, which serves to generate transmit signals and process echo signals, and a transmitter/receiver unit, connected to the electronics unit and serving to transmit the transmit signals in the direction of the filling material in the container and to receive the echo signals. The transmitter/receiver unit and the electronics unit are—depending upon the embodiment—designed as spatially separated units, which are, for example, connected to one another by means of a cable (a so-called "remote" variant) or formed as spatially adjacent units (a so-called "compact" variant). The invention relates to both the remote and compact variants.

In a measuring mode, the transmitter/receiver unit emits transmit signals with a frequency from the microwave range or higher frequency transmit signals in the direction of the filling material. A filling material echo signal is generated by means of reflection of the transmit signals at a surface of the filling material. This is transmitted back to the electronics unit, such that the filling level of the filling material can be determined by the electronics unit from the filling material echo signal—for example, from a transit time difference between the emission of the transmit signal and the reception of the reflected filling material echo signal. The FMCW (frequency-modulated continuous waves) method, with which the frequency range of a continuous transmit signal is changed, and the distance is measured by the frequency difference of the transmit signal from the reflected filling material echo signal, is also used in microwave-based filling level measuring devices. In addition to the filling level, microwave-based filling level measurement devices can also be used to determine the position of a boundary layer in the filling material and a dielectric constant (also: DC value) of the filling material as further process variables.

Microwave-based filling level measurement devices are available in numerous variants, which can basically be divided into two groups, referred to as "free-radiating" or "guided." Guided microwave-based filling level measuring devices are distinguished from free-radiating ones by the fact that they comprise an electrically-conductive probe connected to the transmitter/receiver unit. The probe projects into the filling material and serves to forward the transmit signals and the echo signals.

The present application relates to such guided microwave-based filling level measuring devices with a probe, as described, for example, in DE 10 2014 112 453 A1. A guided microwave-based filling level measuring device is manufactured and marketed by the applicant under the name, "Levelflex."

A device and method for calibrating and/or verifying a free-radiating, microwave-based, filling level measuring device with a reflection point arranged inside a container is disclosed in patent specification DE 44 19 462 C2.

It is desirable that calibration and/or verification of the filling level measuring device also be able to be performed while the system is substantially in operation. In this case, calibration and/or verification is performed on a container filled with filling material; this is also referred to as wet calibration or in-line calibration. Thereby, the filling level measuring device remains in an installed state, in the and/or on the container that may be filled with filling material.

SUMMARY

Therefore, the invention is based upon the object of providing a simple option of in-line calibration and/or verification for a guided microwave-based filling level measuring device.

The object is achieved by a filling level measuring device and a method for in-line calibration and/or verification.

With regard to the filling level measuring device, the object is achieved by a filling level measuring device for microwave-based determination of the filling level of a filling material in a container, having an electronics unit, which is designed to generate transmit signals and process echo signals;

a transmitter/receiver unit, connected to the electronics unit and designed to transmit the transmit signals in the direction of the filling material in the container and to receive the echo signals; and an electrically-conductive probe connected to the transmitter/receiver unit, which probe projects into the filling material and serves to forward the transmit signals and the echo signals, wherein the transmitter/receiver unit emits transmit signals along the probe in the direction of the filling material in a measuring mode, wherein a filling material echo signal is generated by means of reflection of the transmit signals at a surface of the filling material, which signal is returned along the probe to the transmitter/receiver unit and transmitted to the electronics unit, such that the filling level of the filling material can be determined by the electronics unit from the filling material echo signal, characterized in that the filling level measuring device has at least one reflection point arranged outside the container, which reflection point generates a reflection point echo signal by means of reflection of the transmit signal,
and wherein the electronics unit calibrates and/or verifies the filling material echo signal in-line based upon the at least one reflection point echo signal.

The transmit signals are, for example, high-frequency transmit signals, i.e., from high-frequency measurement technology, with a frequency from 3 MHz to approximately 30 THz or beyond. A reflection point is characterized by the fact that a partial reflection of the transmit signal takes place at it due to an impedance jump. If the position of the reflection point is fixed and known, a calibration and/or verification of the filling level measuring device can be carried out based upon a reflection point.

In the context of the invention, at least one reflection point is now arranged outside the container for whose filling material the filling level can be determined with the filling level measuring device. The reflection for the generation of the reflection point echo signal used in the calibration thus preferably does not take place exclusively at reflection points that are arranged inside the (for example, closed) container.

In one embodiment, the filling level measuring device has at least two reflection points.

In one embodiment of the filling level measuring device, at least one reflection point is arranged inside the container.

In one embodiment of the filling level measuring device, the probe has an end-of-probe (EOP) reflection point within the container, which end-of-probe (EOP) reflection point is formed by the end, facing away from the external transmitter/receiver unit, of the probe.

In one embodiment of the filling level measuring device, the filling level measuring device comprises: a cable, wherein the electronics unit is connected to the transmitter/receiver unit by means of the cable, and the cable serves to forward the transmit and echo signals, and wherein the cable comprises at least one reflection point. The cable is arranged outside the container. Advantageously, therefore, the cable itself is used to generate the impedance jump, by means of which the reflection point arranged outside the container is formed. This also has the positive effect that a cable is usually very easy to replace, such that adding the reflection point outside the container to a filling level measurement device from the prior art for calibration purposes (or, if necessary, removing it for measurement afterwards) is particularly easy.

In one embodiment of the filling level measuring device, the cable is coiled and arranged in a box, wherein the electronics unit is substantially directly adjacent to the box, and the box is substantially directly adjacent to the transmitter/receiver unit.

In the event that the filling level measuring device is the aforementioned compact variant without a cable, it is possible, for example, to add, for the purpose of calibration, a coiled cable to the compact variant by means of corresponding branches.

In a further development of the filling level measuring device, the cable is a coaxial cable having a first coaxial cable section and a second coaxial cable section adjacent to the first coaxial cable section, wherein the reflection point is formed by a transition point between the first coaxial cable section and the second coaxial cable section.

In a first embodiment of the preceding further development, a first insulation layer of the first coaxial cable section and a second insulation layer of the second coaxial cable section have dielectric constants different from one another.

Thus, the first coaxial cable section and the second coaxial cable section differ with respect to their mutually different dielectric constants in their respective insulation layers. This causes an impedance jump in the coaxial cable at the transition point, thus forming the reflection point at the transition point between the two coaxial cable sections.

In a second embodiment of the preceding further development, a first inner conductor and a first outer conductor of the first coaxial cable section and a second inner conductor and a second outer conductor of the second coaxial cable section are dimensioned such that a first quotient, formed by the diameter of the first inner conductor divided by the diameter of the first outer conductor, is different from a second quotient formed by the diameter of the second inner conductor divided by the diameter of the second outer conductor.

Thus, in this embodiment, the impedance jump at the transition point is caused by the differing quotients or ratios of the diameters in the first coaxial cable section and the second coaxial cable section.

In a further development of the filling level measuring device, the cable is a coaxial cable, and the reflection point of the cable is formed by a stub circuit, wherein the stub circuit is connected to at least one conductor of the coaxial cable, viz., to an inner conductor and/or to an outer conductor of the coaxial cable, by means of a stub arranged at a fixed position of the cable.

In one embodiment of the latter further development, the stub circuit comprises a switch.

In particular, the stub circuit also comprises other circuit components. The position of the switch can be used, for example, to determine whether different circuit components (for example, resistors, inductances, capacitances, etc.) are connected in the stub circuit, or whether, for example, at the stub, the outer conductor is short-circuited with the inner conductor via the stub circuit.

By means of the position of the switch, therefore, in particular an amplitude ratio between the reflection point echo signal and the filling material echo signal can be set. The switch can be used, for example, to switch between operation with the smallest possible amplitude of the reflection point echo signal and operation with the largest possible amplitude of the reflection point echo signal.

In one embodiment of the filling level measuring device, a connection point between the transmitter/receiver unit and the probe, at which connection point the transmit signals couple into the probe, forms a coupling-in reflection point.

In a further development of the filling level measuring device, the probe has at least one further reflection point, which generates a further reflection point echo signal, wherein the further reflection point is arranged between the end, facing away from the external transmitter/receiver unit, of the probe and the connection point.

In one embodiment of the latter further development, the further reflection point of the probe is formed by a transition between a first probe section and a second probe section.

For example, the probe comprises a first probe section made of a first material and a second probe section made of a second material adjacent to the first probe section, wherein the first material and the second material have RF (radio frequency) properties that are different from one another.

Alternatively, both probe sections are made of the same material, but, between the probe sections, another material is inserted, which has a different RF property—for example, in the form of a pin-shaped element (such as a "pin") between the two probe sections.

In one embodiment of the filling level measuring device, the further reflection point of the probe is formed by a local modification of the shape of the probe.

The local modification is selected in particular from the groups of the following: a bulge, an indentation, a groove, and a bore.

If necessary, further reflection points may be formed by components in the container, such as a vibronic filling level limit switch, an agitator, or other lateral components.

With regard to the method, the object is achieved by a method for in-line calibration and/or verification in determining the filling level of a filling material in a container, with a microwave-based filling level measuring device according to at least one of the preceding claims, wherein transmit signals are transmitted along the probe in the direction of the filling material by the external transmitter/receiver unit in a measuring mode, a filling material echo signal is generated by means of reflection of the transmit signals at a surface of the filling material, which echo signal is returned along the probe to the transmitter/receiver unit and transmitted to the electronics unit, such that the filling level of the filling material is determined by the electronics unit from the filling material echo signal, characterized in that the method comprises the following steps:
  generating at least one reflection point echo signal, which is generated by means of reflection of the transmit signal at a reflection point, wherein the at least one reflection point is arranged outside the container,
  in-line calibration and/or verification of the filling material echo signal based upon the at least one reflection point echo signal.

In one embodiment of the method, based upon the reflection point echo signal of the coupling-in reflection point, buildup at the connection point and/or corrosion at the connection point is detected.

In general, buildup results in reflection point echo signals that have a phase shift of 180° from the transmit signal. Corrosion, on the other hand, tends to cause reflection point echo signals without a significant phase shift. Therefore, taking into account the phase shift, it may also be possible to conclude whether buildup or corrosion is present.

BRIEF DESCRIPTION OF THE DRAWINGS

The invention and further advantageous embodiments are explained in more detail below with reference to exemplary embodiments. The same parts are labeled with the same reference sign in all figures; for reasons of clarity or if it appears sensible for other reasons, reference signs used before are not repeated in the subsequent figures.

Shown are.

DETAILED DESCRIPTION

Figure 1:
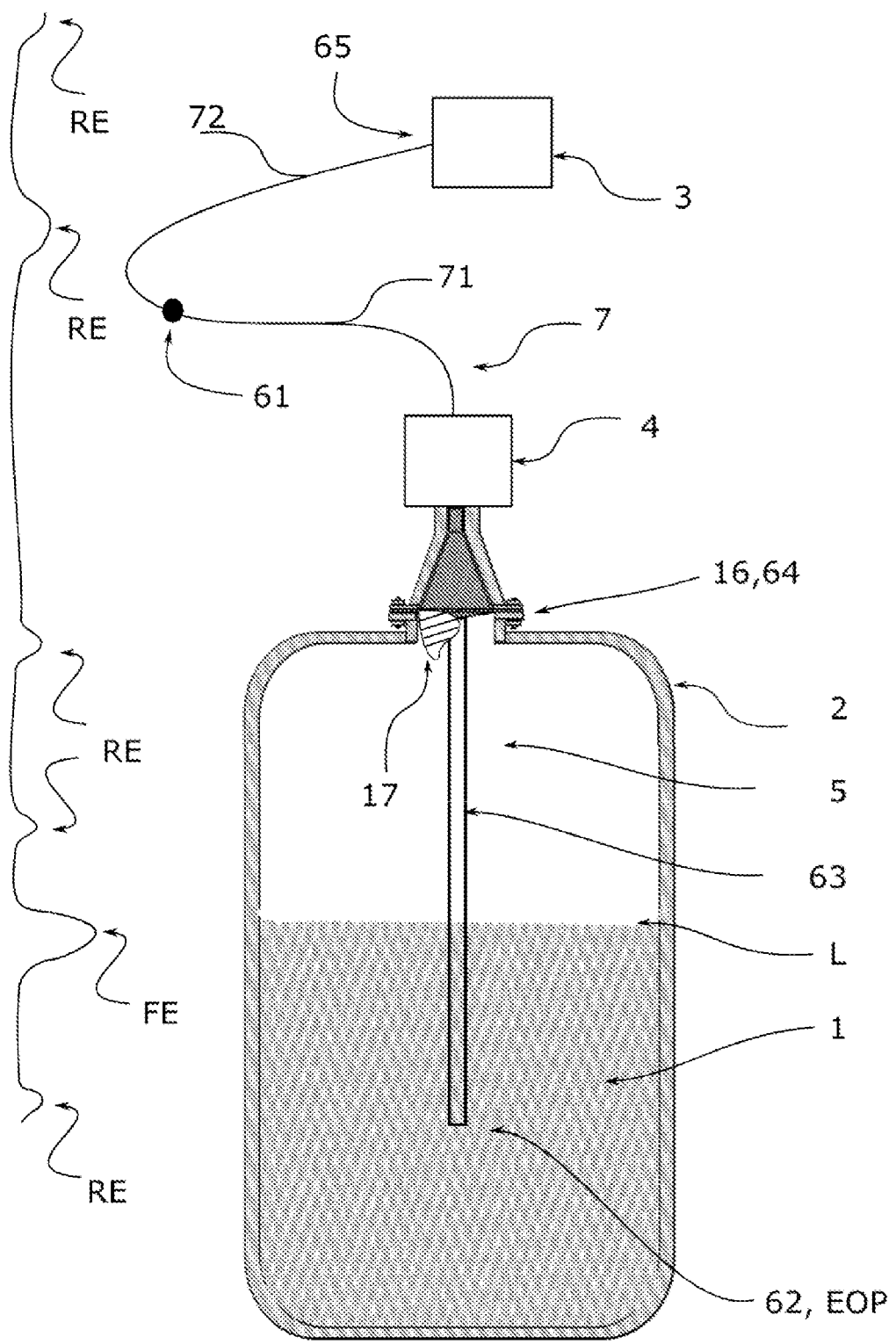
FIG. 1 shows an embodiment of a filling level measuring device according to the present disclosure.

FIG. 1 shows an embodiment of a filling level measuring device according to the invention. This comprises a probe 5, which projects into a container 2 containing a filling material 1. Via the probe 5, transmit signals from an external transmitter/receiver unit 4 are transmitted in the direction of the filling material 1, reflected at a surface of the filling material 1, and then transmitted back via the probe 5 to the external transmitter/receiver unit 4 arranged at an upper closure of the container 2. The transmitter/receiver unit 4 is connected via a cable 7 to an electronics unit 3, which is designed to generate the transmit signals and process echo signals.

The embodiment shown in FIG. 1 is the remote variant mentioned above of the filling level measuring device, in which the transmitter/receiver unit 4 is spatially separated from the electronics unit 3. According to the invention, at least one reflection point 61 arranged outside the container 2 is provided. This is inserted into the cable 7 in FIG. 1. For this purpose, see also FIGS. 3 and 4, in which the reflection point 61 is arranged between a first coaxial cable section 71 and a second coaxial cable section 72.

Furthermore, a zero-point reflection 65 is present at the attachment point between the electronics unit 3 and the cable 7.

Furthermore, the filling level measuring device also comprises other reflection points 62, 63, 64, including:
  an EOP reflection point 62, which is arranged at an end (EOP), facing away from the transmitter/receiver unit 4, of the probe 5,
  a coupling-in reflection point 64, which is arranged at a connection point 16 between the transmitter/receiver unit 4 and the probe 5, and
  a further probe reflection point 63, which is arranged between the one EOP reflection point 62 and the connection point 16.

The echo signals, which are recorded by the filling level measuring device according to the invention and processed by the electronics unit 3, are plotted on the left edge of FIG. 1 in the form of a function amplitude as a function of the transit time. The amplitude is plotted along the horizontal axis (from left to right in the image plane), and the transit time, which is convertible to a distance, is plotted along a vertical axis (from top to bottom in the image plane). If necessary, the electronics unit 3 of the filling level measuring device still comprises corresponding components and/or algorithms for amplifying the various echo signals FE, RE.

The echo signals FE, RE comprise, on the one hand, a filling material echo signal FE, which is used to determine the filling level L (in that, for example, from the transit time of the filling material echo signal FE, a distance and, from this, the filling level L can be determined), and, on the other, several reflection point echo signals RE. The latter are generated by single reflection of the transmit signal at the reflection points 61, 62, 63, 64, 65 according to the invention. Of course, multiple reflections also occur; these usually manifest themselves only as a background noise in the amplitude.

By means of the reflection point echo signals RE, a calibration and/or a verification can be performed. During calibration, for example, a constant factor for converting the transit time of the reflection point echo signals RE into a path distance is determined based upon the known and fixed position of 61, 62, 63, 64, 65 and the recorded transit time of the reflection point echo signals RE. This factor can then be compared, during calibration and/or verification, with a factor stored in the filling level measuring device—for example, in its electronics unit 3.

Calibration is usually understood as the detection of a deviation; in this case, a deviation between the factor determined via the reflection point echo signals RE (and assumed to be correct) and the stored factor. Verification additionally comprises determining the exact value of the deviation and its evaluation. Adjustment means adjusting the filling level measuring device in such a way that the detected deviation is compensated for by the adjustment. If necessary, an adjustment is also made in which the stored factor is adjusted on the basis of the reflection point echo signals RE.

When using several reflection point echo signals RE, a multi-point calibration can be performed, e.g., at least a 2-point calibration, using the reflection point 61 of the cable 7 and the EOP reflection point 62, and at least a 5-point calibration, taking into account all reflection points 61, 62, 63, 64, 65 shown in FIG. 1.

Preferably, the calibration and/or verification can be done in-line, i.e., for a filling level measuring device installed in a process plant and in the event there is filling material 1 in the container 2.

Furthermore, based upon the coupling-in reflection point 64, in one embodiment of the method according to the invention, it is possible to check whether the buildup 17 has formed on the transmitter/receiver unit 4 or whether corrosion is more likely to be present. As mentioned above, this is done, for example, by taking into account a phase relationship between the emitted transmit signal and the received reflection point echo signal RE of the coupling-in reflection point 64.

Figure 2:
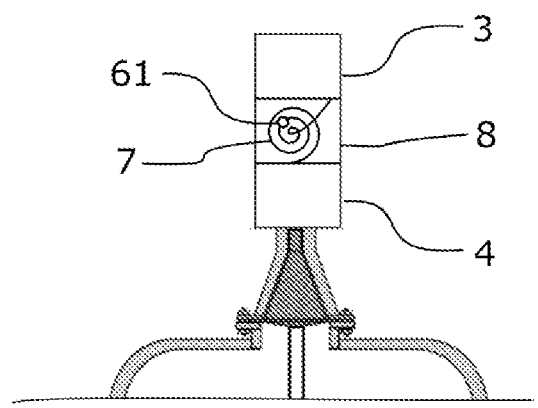
FIG. 2 shows a further embodiment of a filling level measuring device according to the present disclosure.

As already mentioned at the beginning, the solution according to the invention is suitable both for the remote variant shown in FIG. 1 and for the compact variant. The latter is shown in more detail in FIG. 2, wherein, here, the electronics unit 3 of the filling level measuring device is substantially directly adjacent to the transmitter/receiver unit 4 via a box 8. The cable 7 is rolled up in the box 8, in which the reflection point 61 is inserted. Such a cable 7 with a reflection point 61 can, if necessary, also be added subsequently to a compact variant of the filling level measuring device without a cable via corresponding branch connections.

Figure 3:
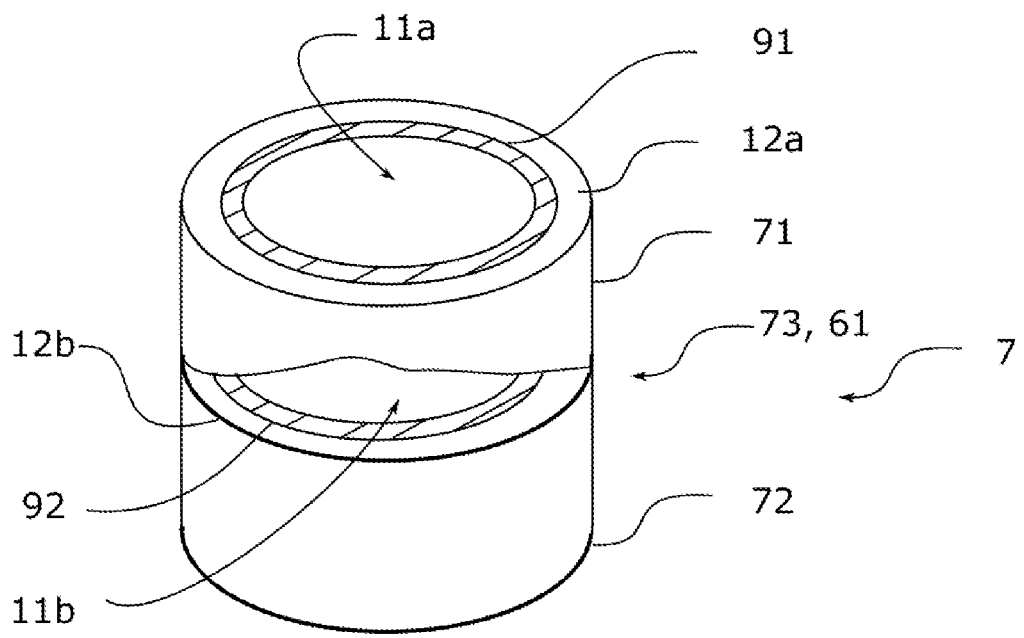
FIG. 3 shows an embodiment of a cable of a filling level measuring device according to the present disclosure.

FIG. 3 shows one option for providing a cable 7 with a reflection point 61. In the embodiment shown in FIG. 3, a perspectival view of a section of the cable 7 is shown in more detail. For forwarding the signals between the electronics unit 3 and the transmitter/receiver unit 4, a coaxial cable is used here, which in principle comprises an inner conductor on the inside, an outer conductor on the outside, and an insulation layer arranged between the inner conductor and the outer conductor. According to the invention, the coaxial cable 7 of the embodiment shown in FIG. 3 now comprises a first coaxial cable section 71 and a second coaxial cable section 72, which adjoin one another at a transition point 73 where the reflection point 61 is formed.

The impedance jump at the reflection point 61 is caused here, for example, by the fact that the dielectric constant of a first insulation layer 91 in the first coaxial cable section 71 differs from the dielectric constant of a second insulation layer 92 in the second coaxial cable section 72. Otherwise, the cross-sections of the two coaxial cable sections 71, 72 can be of substantially identical construction. The differing dielectric constants of the insulation layers 91, 92 are set, for example, mainly only by a corresponding selection and/or adaptation of a material for the respective insulation layer 91, 92.

An alternative option is to design a diameter ratio of the conductive layers 11*a*, 12*a* or 11*b*, 12*b* in the two coaxial cable sections 71, 72 to differ. This also causes an impedance jump at the transition point 73, such that a reflection point 61 is present. In particular, a ratio of a diameter of a first inner conductor 11*a* to a diameter of a first outer conductor 12*a* in the first coaxial cable section 71 (first quotient) is different from a ratio of a diameter of a second inner conductor 11*b* to a diameter of a second outer conductor 12*b* in the second coaxial cable section 72 (second quotient). This can also be achieved, for example, by using a uniform insulation layer 91, 92 and otherwise the same materials for inner conductors 11*a*, 11*b* and outer conductors 12*a*, 12*b*. The different diameter ratio is not explicitly shown to scale in FIG. 3.

Figure 4:
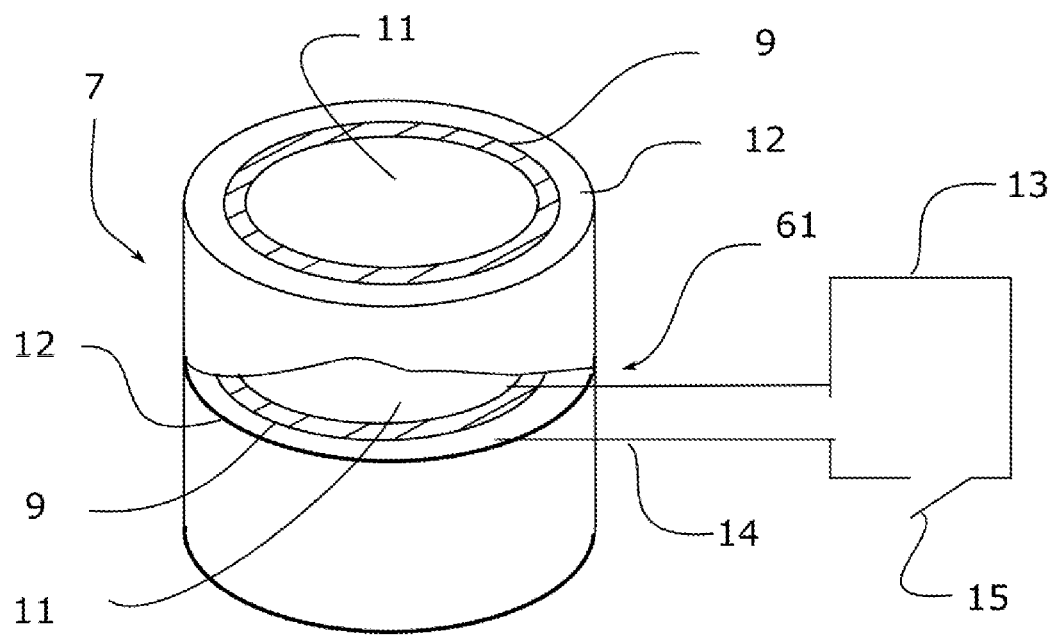
FIG. 4 shows a further embodiment of a cable of a filling level measuring device according to the present disclosure.

FIG. 4 shows a further option for equipping a cable 7 with a reflection point 61. In this embodiment, the cable 7 is a unitary coaxial cable, i.e., having a unitary inner conductor 11, outer conductor 12, and insulation layer 9. The reflection point 61 of the cable 7 is formed in that stubs 14 are connected to the inner conductor 11 and the outer conductor 12 at this point. The stubs 14 are integrated into a stub circuit 13. Into the stub circuit 13 may also be integrated other circuit components not shown in detail here, which also determine typical electronic circuit variables of the stub circuit 13, i.e., resistances, capacitances, inductances, etc. In the simplest case, the inner conductor 11 is short-circuited with the outer conductor 12 via the stub circuit 13. Such a short circuit of the stub 14 leads to a comparatively strong reflection point echo signal RE at the reflection point 61, compared to the filling material echo signal FE to be used for filling level determination. "Strong" here means with respect to their respective amplitudes.

In a preferred variant, a switch 15 is also arranged in the stub circuit 13, such that the stub circuit 13 can be switched between an "open stub" variant and a "closed stub" variant with an inner conductor 11 and an outer conductor 12 short-circuited with one another. The "open stub" position is suitable for a pure measuring mode, for example, such that here the filling material echo signal FE is not disturbed too greatly by the reflection point echo signal RE, and the energy required to generate the reflection point echo signal RE is reduced. On the other hand, the "closed stub" position is suitable in the event that calibration and/or verification is performed, in order to obtain a particularly prominent reflection point echo signal RE with the largest possible amplitude in calibration mode.

Of course, the cable 7 can also have several such reflection points 61, each of the same kind and/or different from one another, by combining accordingly the embodiments mentioned in connection with the preceding in FIGS. 3 and 4.

Furthermore, the probe 5 itself can have several reflection points 62, 63; see FIGS. 5 *a, b*. Each probe 5 has (naturally) an EOP reflection point 62 at its end facing away from the transmitter/receiver unit 4.

Figures 5A, 5B:
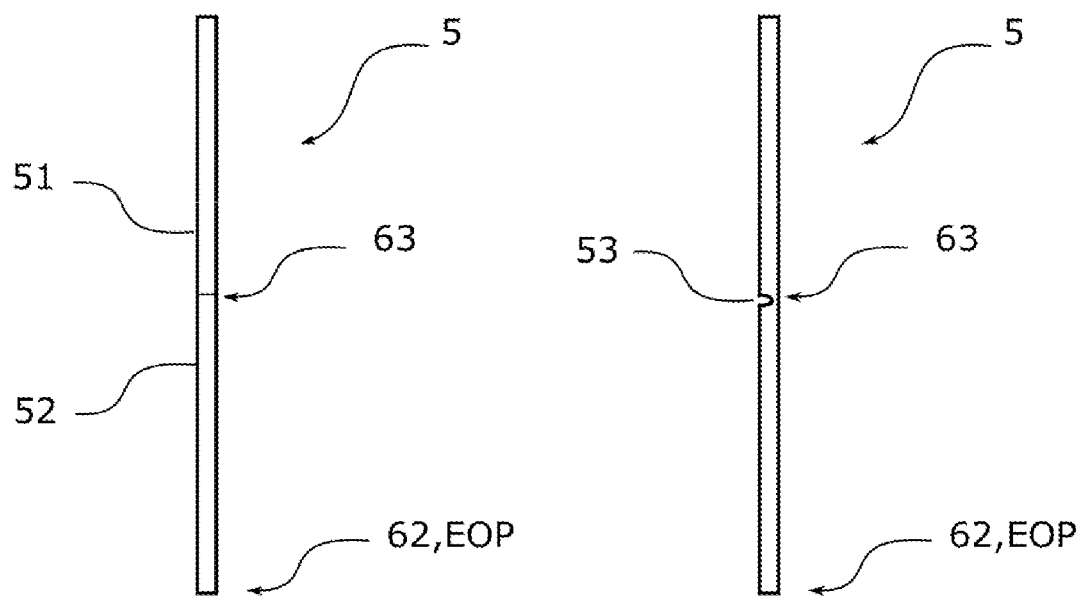
FIGS. 5a, b shows embodiments of a probe of a filling level measuring device according to the present disclosure.

In FIG. 5*a*, the probe 5 also has a further probe reflection point 63, which is formed by using two adjacent probe sections 51, 52 with different high-frequency properties. Therefore, at the transition from the first probe section 51 to the second probe section 52, the impedance jump takes place. Alternatively, the two probe sections 51, 52 are made of the same material, with a pin-shaped element (not shown) made of a different material, i.e., with different high-frequency properties, inserted between them.

In FIG. 5*b*, on the other hand, a local modification 53 is introduced into the probe 5, here in the form of an indentation of the probe 5. The indentation also leads to an impedance jump. The invention comprises further variants for local geometric modifications of the probe 5, including, for example, one of the aforementioned variants of bulge, groove, bore, etc.

In FIGS. 5a, 5b, the further probe reflection point 63 is arranged centrally between the connection point 16 and the end of the probe 5 with the EOP reflection point 62. Of course, the invention also comprises non-centered arrangements or a probe 5 with several further probe reflection points 63.

The invention claimed is:

1. A filling level measuring device for a microwave-based determination of a filling level of a filling material in a container, comprising:
   an electronics unit designed to generate transmit signals and process echo signals;
   a transmitter/receiver unit connected to the electronics unit and designed to transmit the transmit signals in a direction of the filling material in the container and to receive the echo signals;
   an electrically-conductive probe connected to the transmitter/receiver unit, wherein the probe is embodied to project into the filling material and to forward the transmit signals and the echo signals;
   a coaxial cable connecting the electronics unit to the transmitter/receiver unit, wherein the cable is configured to forward the transmit and echo signals; and
   at least one reflection point arranged outside the container, wherein the at least one reflection point is embodied to generate a reflection point echo signal by reflecting the transmit signal,
   wherein the cable has the at least one reflection point, and the at least one reflection point is formed by a stub circuit connected to at least one conductor of the coaxial cable, viz., to an inner conductor and/or to an outer conductor of the coaxial cable, via a stub arranged at a fixed position of the cable,
   wherein the transmitter/receiver unit is embodied to transmit transmit signals along the probe in the direction of the filling material in a measuring mode,
   wherein a filling material echo signal is generated by reflection of the transmit signals at a surface of the filling material, wherein the filling material echo signal is returned along the probe to the transmitter/receiver unit and transmitted to the electronics unit such that the filling level of the filling material can be determined by the electronics unit from the filling material echo signal, and
   wherein the electronics unit is configured to calibrate and/or verify the filling material echo signal in-line based upon the reflection point echo signal.

2. The filling level measuring device according to claim 1, wherein the cable is coiled and arranged in a box, wherein the electronics unit is adjacent to the box and the box is adjacent to the transmitter/receiver unit.

3. The filling level measuring device according to claim 1, wherein the stub circuit includes a switch.

4. A method for in-line calibration and/or verification in determining a filling level of a filling material in a container with a microwave-based filling level measuring device, the method comprising:
   providing the microwave-based filling level measuring device, including,
      an electronics unit designed to generate transmit signals and process echo signals;
      a transmitter/receiver unit connected to the electronics unit and designed to transmit the transmit signals in a direction of the filling material in the container and to receive the echo signals;
      an electrically-conductive probe connected to the transmitter/receiver unit, wherein the probe is embodied to project into the filling material and to forward the transmit signals and the echo signals;
      a coaxial cable connecting the electronics unit to the transmitter/receiver unit, wherein the cable is configured to forward the transmit and echo signals; and
      at least one reflection point arranged outside the container, wherein the at least one reflection point is embodied to generate a reflection point echo signal by reflecting the transmit signal,
      wherein the cable has the at least one reflection point, and the at least one reflection point is formed by a stub circuit connected to at least one conductor of the coaxial cable, viz., to an inner conductor and/or to an outer conductor of the coaxial cable, via a stub arranged at a fixed position of the cable,
      wherein the transmitter/receiver unit is embodied to transmit transmit signals along the probe in the direction of the filling material in a measuring mode,
      wherein a filling material echo signal is generated by reflection of the transmit signals at a surface of the filling material, wherein the filling material echo signal is returned along the probe to the transmitter/receiver unit and transmitted to the electronics unit such that the filling level of the filling material can be determined by the electronics unit from the filling material echo signal, and
      wherein the electronics unit is configured to calibrate and/or verify the filling material echo signal in-line based upon the reflection point echo signal;
   transmitting signals along the probe in the direction of the filling material by the transmitter/receiver unit in a measuring mode;
   generating a filling material echo signal by a reflection of the transmit signals at the surface of the filling material wherein the echo signal is returned along the probe to the transmitter/receiver unit and transmitted to the electronics unit;
   determining the filling level of the filling material by the electronics unit from the filling material echo signal;
   generating at least one reflection point echo signal via reflection of the transmit signal at a reflection point, wherein the reflection point is arranged outside the container; and
   in-line calibrating and/or verifying of the filling material echo signal based upon the at least one reflection echo signal.

* * * * *